United States Patent [19]
Barra et al.

[11] Patent Number: 5,668,259
[45] Date of Patent: Sep. 16, 1997

[54] METALLIZABLE DISAZO COMPOUNDS HAVING 1, 3-DIHYDROXYBENZENE BIS-COUPLING COMPONENT RADICALS, IRON COMPLEXES THEREOF AND MIXTURES OF SUCH IRON COMPLEXES

[75] Inventors: Jordi Berenuger Barra, Barcelona, Spain; Herbert Holliger, Allschwil, Switzerland; Jose Rocas Sorolla, Barcelona, Spain

[73] Assignee: Clariant Finance (BVI) Limited, Tortola, Virgin Islands (Br.)

[21] Appl. No.: 443,492

[22] Filed: May 15, 1995

Related U.S. Application Data

[63] Continuation of Ser. No. 123,956, Sep. 20, 1993, abandoned, which is a continuation of Ser. No. 20,478, Feb. 22, 1993, abandoned, which is a continuation of Ser. No. 776,133, Oct. 15, 1991, abandoned.

[30] Foreign Application Priority Data

Oct. 15, 1990 [GB] United Kingdom .................. 9022355

[51] Int. Cl.$^6$ .................................................. C09B 45/32
[52] U.S. Cl. ............................... 534/684; 8/437; 8/681; 8/685; 8/919; 534/688
[58] Field of Search ................................... 534/684, 688; 8/437, 681, 685, 919

[56] References Cited

U.S. PATENT DOCUMENTS

| | | | |
|---|---|---|---|
| 4,491,543 | 1/1988 | Bergmann et al. | 534/677 |
| 4,996,302 | 2/1991 | Langfeld | 534/582 |
| 5,104,979 | 4/1992 | Hansen et al. | 534/684 X |

FOREIGN PATENT DOCUMENTS

| | | | |
|---|---|---|---|
| 68245 | 1/1983 | European Pat. Off. . | |
| 140252 | 5/1985 | European Pat. Off. | 534/688 |
| 212412 | 3/1987 | European Pat. Off. . | |
| 260557 | 3/1988 | European Pat. Off. . | |
| 322357 | 6/1989 | European Pat. Off. . | |
| 2905431 | 8/1980 | Germany . | |
| 437654 | 4/1974 | Spain . | |
| 968247 | 9/1984 | United Kingdom | 534/629 |

*Primary Examiner*—Fiona Powers
*Attorney, Agent, or Firm*—Robert S. Honor; Carl W. Battle; Melvyn M. Kassenoff

[57] ABSTRACT

Compounds of the formula

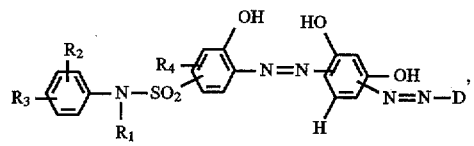

iron complexes thereof and mixtures of such iron complexes, wherein D is a monocyclic or bicyclic aromatic diazo component radical of the benzene series containing one —$SO_3M$ group or is

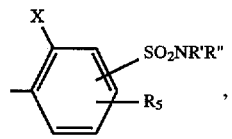

$R_1$ is hydrogen, methyl or ethyl, and
$R_4$ is hydrogen, chloro or $C_{1-2}$alkyl,
wherein R' is hydrogen, $C_{1-4}$alkyl, $C_{2-4}$hydroxyalkyl, methoxy($C_{2-4}$alkyl) or

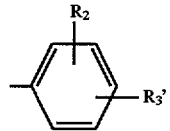

R" is hydrogen, $C_{1-4}$alkyl, $C_{2-4}$hydroxyalkyl or methoxy ($C_{2-4}$alkyl), or
—NR'R" is a saturated 5- or 6-membered ring,
$R_5$ is hydrogen, chloro or $C_{1-2}$alkyl, and
X is hydrogen or hydroxy,
wherein each $R_2$ is independently hydrogen, chloro, hydroxy, $C_{1-2}$alkyl, $C_{1-2}$alkoxy or —$SO_2N R_o R_o$, and
each $R_3$ is independently hydrogen, $C_{1-2}$alkyl, $C_{1-2}$alkoxy, —COOM, trifluoromethyl or —NR'''R'''',
wherein each R''' and R'''' is independently $C_{1-4}$alkyl, $C_{2-4}$hydroxyalkyl, methoxy($C_{2-4}$alkyl) or carbamoyl($C_{1-2}$alkyl), or
—NR'''R'''' is saturated 5- or 6-membered ring,
each $R_o$ is independently hydrogen, $C_{1-4}$alkyl, $C_{2-4}$hydroxyalkyl or methoxy-($C_{2-4}$alkyl), or
—$NR_o R_o$ is a saturated 5- or 6-membered ring, and
each M is independently hydrogen or a cation,
which iron complexes and mixtures of iron complexes are useful for dyeing substrates dyeable with anionic dyes such as leather.

21 Claims, No Drawings

METALLIZABLE DISAZO COMPOUNDS HAVING 1,3-DIHYDROXYBENZENE BIS-COUPLING COMPONENT RADICALS, IRON COMPLEXES THEREOF AND MIXTURES OF SUCH IRON COMPLEXES

This is a continuation of application Ser. No. 08/123,956, filed Sep. 20, 1993 and now abandoned, which is a continuation of application Ser. No. 08/020,478, filed Feb. 22, 1993 and now abandoned, which is a continuation of application Ser. No. 07/776,133, filed Oct. 15, 1991 and now abandoned.

In the dyeing of leather it may be difficult to obtain level dyeings of good colour yield and penetration and further, especially with dyes of brown shades—mainly where these are multicomponent mixtures—, dyeings of very different hues may result on different leathers, in particular on leathers that have been pre-treated (e.g. tanned, retanned, filled, fat-liquored etc.) in different ways. Thus, with leathers of high affinity, where the colour yield may be good it may be difficult to obtain level dyeings of good penetration. In order to obviate this difficulty there may be used levelling agents and penetration assistants, which, however, may lead to a loss of colour yield. With leathers of low affinity, e.g. vegetable tanned leather or retanned leather, while obtaining good penetration and levelness the colour yield may not be satisfactory. Thus, even if a level dyeing of satisfactory penetration may be obtainable, there may still exist the problem of a too low colour yield of the dyeing.

It has now been found that the novel iron complexes described below solve these problems as they are suitable for obtaining level dyeings of satisfactory penetration and high colour yield, even without the use of any levelling agents or penetration assistants, and further that dyeings of the same or very similar shades are obtainable on different leathers.

The invention relates to novel compounds and mixtures, their production and their use as brown dyes, in particular for the dyeing of leather.

The invention thus provides iron-complex mixtures of metallizable disazo compounds in which at least one complexant is a compound of the formula

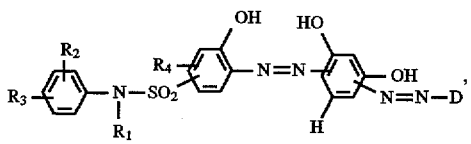  (I)

wherein

D signifies $D_1$ or $D_2$, $D_1$ signifies

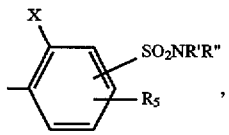  (a)

$D_2$ signifies the radical of a mono- or dicyclic aromatic diazocomponent of the benzene series containing one —$SO_3M$ group, $R_1$ signifies hydrogen, methyl or ethyl, $R_2$ signifies hydrogen, chlorine, hydroxy, $C_{1-2}$-alkyl or -alkoxy or —$SO_2NR_o'R_o''$, $R_3$ signifies hydrogen, $C_{1-2}$-alkyl or -alkoxy, trifluoromethyl, —COOM or —NR'''R'''', $R_4$ signifies hydrogen, chlorine or $C_{1-2}$-alkyl, $R_5$ signifies hydrogen, $C_{1-2}$-alkyl or chlorine, R' signifies hydrogen, $C_{1-4}$-alkyl, $C_{2-4}$-hydroxyalkyl, methoxy-($C_{2-4}$-alkyl) or

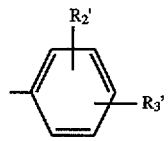  (d)

R'' signifies hydrogen, $C_{1-4}$-alkyl, $C_{2-4}$-hydroxyalkyl or methoxy-($C_{2-4}$-alkyl), or R' and R'' together with the nitrogen to which they are linked form a saturated, nitrogen-containing, 5- or 6-membered heterocyclic ring, $R_2'$ signifies hydrogen, chlorine, hydroxy, $C_{1-2}$-alkyl or -alkoxy or —$SO_2NR_o'R_o''$, $R_3'$ signifies hydrogen, $C_{1-2}$-alkyl or -alkoxy, trifluoromethyl, —COOM or —NR'''R'''', $R_o'$ signifies hydrogen, $C_{1-4}$-alkyl, $C_{2-4}$-hydroxyalkyl or methoxy-($C_{2-4}$-alkyl), $R_o''$ signifies hydrogen, $C_{1-4}$-alkyl, $C_{2-4}$-hydroxyalkyl or methoxy-($C_{2-4}$-alkyl), or $R_o'$ and $R_o''$ together with the nitrogen to which they are linked form a saturated, nitrogen-containing, 5- or 6-membered heterocyclic ring, R''' signifies $C_{1-4}$-alkyl, $C_{2-4}$-hydroxyalkyl, methoxy-($C_{2-4}$-alkyl) or carbamoyl-($C_{1-2}$-alkyl), R'''' signifies $C_{1-4}$-alkyl, $C_{2-4}$-hydroxyalkyl, methoxy-($C_{2-4}$-alkyl) or carbamoyl-($C_{1-2}$-alkyl), or R''' and R'''' together with the nitrogen to which they are linked form a saturated, nitrogen-containing, 5- or 6-membered heterocyclic ring, X signifies hydrogen or hydroxy and M signifies hydrogen or a cation.

The hydrogen in meta position to the two hydroxy groups of the resorcinol nucleus means that this position is unsubstituted.

In the significances of R', R'', $R_o'$, $R_o''$, R''' and R'''' $C_{1-4}$-alkyl may be linear or, where it contains 3 or 4 carbon atoms, also branched; preferred alkyl groups are methyl, ethyl, n-propyl and n-butyl. In the hydroxy- or methoxy-substituted $C_{2-4}$-alkyl radicals the hydroxy or methoxy group is preferably in one of the positions β to δ, representative hydroxyalkyl of methoxyalkyl groups being β-hydroxyethyl, β-hydroxypropyl and δ-hydroxybutyl and the analogous methoxy-substituted groups. $R_1$ preferably is hydrogen. $R_2$ and $R_2'$ independently from each other preferably are hydrogen, chlorine or —$SO_2NR_o'R_o''$; $R_3$ and $R_3'$ independently from each other preferably are hydrogen, methyl, methoxy or —COOM. More preferably at least one of $R_2$ and $R_3$, respectively at least one of $R_2'$ and $R_3'$, is hydrogen. Where R' and R'', or R''' and R'''', or $R_o'$ and $R_o''$, together with the respective nitrogen atom to which they are linked, form a saturated 5- or 6-membered heterocycle, this is preferably pyrrolidino, morpholino or piperidino. Where more than one group —$SO_2NR'R''$ or —$SO_2NR_o'R_o''$ is present in the molecule of formula (I) these groups may have the same significance or different significances. Preferred significances of $R_o'$, $R_o''$ and R'' are, independently from each other, hydrogen, methyl or ethyl, most preferably hydrogen. Preferred significances of R' are hydrogen, methyl, ethyl, γ-methoxypropyl or a radical of formula (d), most preferably hydrogen or phenyl.

The groups —SO$_2$NR'R" and —SO$_2$NR$_o$'R$_o$", independently from each other, preferably are in one of the positions meta and para to the respective azo or —NR$_1$— groups to which the respective benzene rings are bound. The radical of the formula

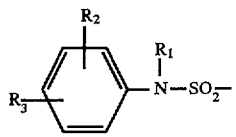 (x)

is preferably in one of the available positions meta and para to the azo group, more preferably in para to the hydroxy group.

If R$_4$ or R$_5$ signify chlorine or C$_{1-2}$-alkyl this may be in any of the available positions ortho, meta or para to the respective azo group; most preferably each of R$_4$ and R$_5$ signifies hydrogen.

M may be hydrogen or any cation conventional in carboxy or sulpho group-containing metal complex dyes, preferably unsubstituted or substituted ammonium (in particular ammonium substituted with C$_{1-4}$-alkyl and/or with β-hydroxy-C$_{2-3}$-alkyl, preferably mono-, di- or triethanol- or -isopropanolammonium), alkaline earth metal (in particular magnesium) or alkali metal (in particular lithium, sodium or potassium), of which potassium and especially sodium are preferred.

D$_2$ preferably is

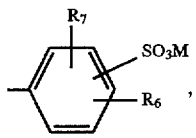 (b$_1$)

wherein

R$_6$ signifies hydrogen, C$_{1-2}$-alkyl or -alkoxy or —NO$_2$ and

R$_7$ signifies hydrogen, chlorine or C$_{1-2}$-alkyl, and/or

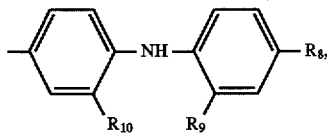 (b$_2$)

wherein

R$_8$ signifies hydrogen, methoxy, —NO$_2$ or —SO$_3$M,

R$_9$ signifies hydrogen, methoxy, —NO$_2$ or —SO$_3$M and

R$_{10}$ signifies hydrogen, —SO$_2$NR$_o$'R$_o$" or —SO$_3$M, at least one of R$_8$, R$_9$ and R$_{10}$ being hydrogen and at least one of R$_8$, R$_9$ and R$_{10}$ being other than hydrogen, methoxy and —NO$_2$.

If in the radical of formula (b$_2$) R$_{10}$ signifies —SO$_2$NR$_o$'R$_o$" the complex contains at least one further radical (b$_2$) that contains a sulpho-group or/and at least one further radical (b$_1$).

R$_6$ preferably signifies hydrogen, methyl, methoxy or the nitro group, advantageously hydrogen or —NO$_2$, most preferably hydrogen. R$_7$ preferably signifies hydrogen, chlorine or methyl, most preferably hydrogen. The sulpho group in formula (b$_1$) is preferably in one of the positions meta and para to the azo group; if R$_6$ and/or R$_7$ are other than hydrogen they may be in any of the remaining available positions. If in formula (b$_2$) R$_{10}$ signifies hydrogen the one of R$_8$ and R$_9$ preferably signifies —NO$_2$ and the other —SO$_3$M. If R$_{10}$ signifies —SO$_3$M or —SO$_2$NR$_o$'R$_o$", preferably one of R$_8$ and R$_9$ signifies hydrogen and the other, signifies methoxy or hydrogen; more preferably R$_8$ and R$_9$ signify hydrogen. Preferably the radical (b$_2$) contains a —SO$_3$M group. Most preferably R$_8$ and R$_9$ signify hydrogen and R$_{10}$ signifies —SO$_3$M.

The iron complexes of the invention are in particular homogeneous iron-complexes or heterogeneous iron-complex mixtures in which at least one of the complexants preferably is a disazo compound of the formula

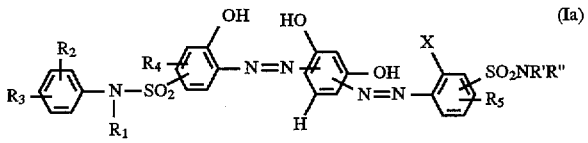 (Ia)

and preferably at least one further complexant is a compound of the formula

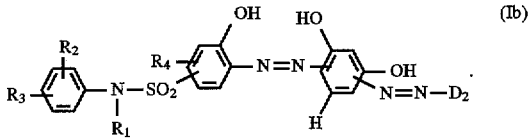 (Ib)

Preferably at least one complexant of formula (Ib) is a compound of the formula

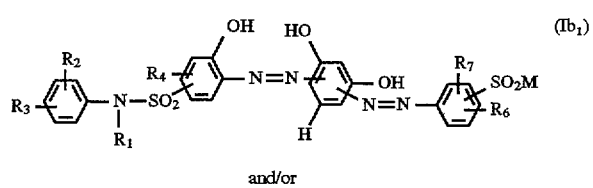 (Ib$_1$)

and/or

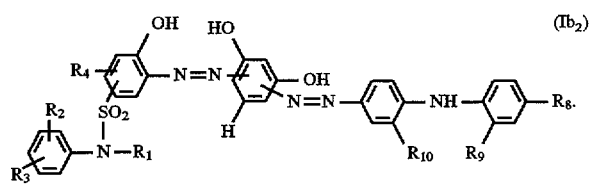 (Ib$_2$)

The iron-complexes of the invention may be homogeneous complexes of two equal complexants of formula (Ia) or (Ib) in the form of Fe-bound ligand-radicals and/or, preferably, mixed complexes containing at least one complexant of formula (Ia) and at least one complexant of formula (Ib) in the form of Fe-bound ligand-radicals.

A particular further aspect of the invention is represented by mixed iron complexes in which at least one complexant corresponds to formula (Ia) and at least one further complexant corresponds to formula (Ib$_1$) and/or (Ib$_2$).

A particular preferred aspect of the invention is represented by mixed iron complexes in which at least one complexant corresponds to formula (Ia), at least one complexant corresponds to formula (Ib$_1$) and at least one further complexant corresponds to formula (Ib$_2$).

The iron-complexes of the invention may be synthesized analogously to known methods mainly by diazotization, coupling and metallization reactions, in particular either (α) by metallizing at least one complexant of formula (I) as defined above and optionally at least one further complexant [preferably at least one compound of formula (Ia) as defined above and at least one complexant of formula (Ib) as defined above, more preferably at least one complexant of formula (Ia) and at least one complexant of formula (Ib$_1$) and/or (Ib$_2$) as defined above] with an iron-yielding compound or (β) by coupling the diazo compound(s) of at least one amino compound of the formula

D$_1$—NH$_2$     (II)

and/or

D$_2$—NH$_2$     (III)

to a 1:2 iron complex of a monoazo compound of the formula

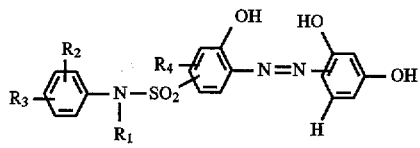
(IV)

or to a mixture thereof.

Preferred amines of formula (III) are of the formula

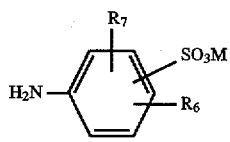
(V)

and/or

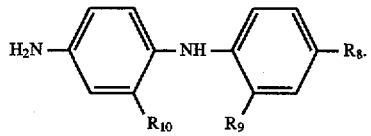
(VI)

The compounds of formula (Ia) may be synthesized by coupling the diazo compound of an amine of formula (II) to a monoazo compound of formula (IV).

The compounds of formula (Ib) may be synthesized by coupling the diazo compound of an amine of formula (III) [in particular of formula (V) and/or (VI)] to a monoazo compound of formula (IV).

The compounds of formula (IV) may be synthesized by coupling the diazo compound of an amine of formula

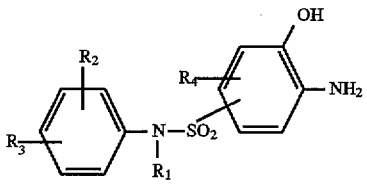
(VII)

to resorcinol. The coupling of the diazo compound of an amine of formula (VII) to resorcinol may take place in any of the positions ortho and para to the hydroxy groups, preferably or mainly in para-position to a hydroxy group.

The 1:2-iron-complexes of the monoazo compounds of formula (IV) may be represented by the formula

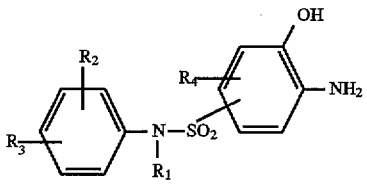
(VIII)

wherein M$_1$ is hydrogen or a cation.

The 1:2-iron-complexes and 1:2-iron-complex mixtures of the invention produced by variant (β) or in which X is hydrogen may be represented by the formula

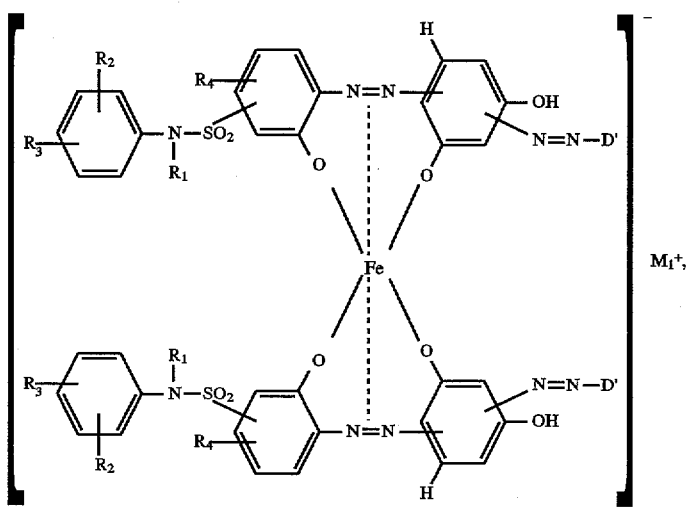
(IX)

wherein at least some of the radicals —D' are radicals —$D_1$ and/or —$D_2$, any further —D' being the radical of another diazo component preferably —$D_2$ and/or —$D_1$.

The azo groups co-ordinatively bound to Fe are linked to the resorcinol nucleus at one of the positions ortho to the Fe-bound oxygen.

If X is hydroxy and the Fe-complexes are produced by variant (α) a further Fe-complex-formation takes place at this hydroxy group together with the azo-group in ortho to this X and the other available hydroxy group of the resorcinol radical in ortho to this azo-group. Thus the Fe-complexes of the invention comprise in particular such complexes in which the ratio of Fe to the Fe-linked complexant-radicals is 1:2 or more than 1:2 (e.g. up to 2:3) depending on the number of metallizable sites in the complex-forming disazo compounds and also on the quantity of the employed iron-yielding compound.

$M_1^+$ may be hydrogen (e.g. in the form of a hydroxonium ion) or a cation, e.g. as indicated for M above. $M_1^+$ is preferably a cation, in particular if the molecule contains at least one sulpho or carboxy group.

The involved reactions for the synthesis of the iron-complexes of the invention may be carried out in a manner known per se. Thus, the coupling of the diazo compound of an amine of formula (VII) to resorcinol may be carried out under basic conditions, suitably in aqueous medium at pH-values of at least 7.5 (principally in the range of 8 to 14) and under mild temperature conditions, preferably in the range of −5° C. to +25° C., more preferably in the range of 0° to 20° C.; the pH-value may be adjusted by addition of a suitable base, preferably alkali metal hydroxides or carbonates, ammonia or an amine. Where more than one diazocomponent is used [in particular diazo compounds of formulae (II) and (III), especially (II) and (V) and/or (VI)] these may be coupled sequentially or in admixture with each other. Preferably the coupling reactions with more than one diazo component are carried out sequentially, in any desired order. The coupling of the diazo compound of an amine of formula (II) to a compound of formula (IV) or to a 1:2-iron-complex thereof [in particular corresponding to formula (VIII)] may be carried out in a similar or even in the same temperature range as the first coupling, preferably in aqueous medium and at pH-values preferably ≧5, in particular in the range of 5 to 12, more preferably at pH-values in the range of 7 to 11. If formulae (II) and (VII) have the same significance the coupling of the diazocompounds of these amines to resorcinol may be carried out together in one sequence. The coupling of a diazo compound of an amine of formula (III), in particular (V), may be carried out in a similar or even in the same temperature range as for the diazo compound of an amine of formula (II), preferably in aqueous medium and at pH values preferably in the range of 9.5 to 14. The coupling of the diazo compound of an amine of formula (VI) may be carried out in a similar or even in the same temperature range as the other coupling reactions mentioned above, preferably in aqueous medium and at pH values preferably in the range of 7.5 to 14, more preferably 8 to 12. If desired, the coupling reactions may be catalyzed by addition of conventional coupling accelerators. The setting of acidic conditions may be done in conventional manner, suitably by addition of an acid, e.g. a mineral acid (preferably sulphuric or hydrochloric acid) or a low molecular weight aliphatic acid (preferably formic or acetic acid).

The metallization of monoazo compounds of formula (IV) or disazo compounds of formula (I) and optionally further disazo compounds, in particular the metallization of compounds of formulae (Ia) and/or (Ib), preferably (Ia) and ($Ib_1$) and/or ($Ib_2$), to the corresponding iron-complexes, mainly 1:2-iron-complexes, may be carried out in conventional manner, employing conventional iron-compounds, e.g. ferrous or ferric acetate or iron salts of inorganic acids, e.g. ferrous sulphate, ferric sulphate, ferrous nitrate, ferric nitrate or iron trichloride, suitably in aqueous medium, advantageously at pH-values in the range of 3.5 to 6.5, preferably 4 to 6 with heating. Preferably the metallization is carried out at temperatures in the range of 40° C. to reflux temperature, preferably 60° to 100° C. If desired, the pH of the reaction mixture may, after completion of the coupling and metallization reactions, be increased by addition of a suitable base for more convenient dyestuff isolation and/or salt formation, in particular if the dye contains one or more sulpho groups. The obtained dye may be isolated from the reaction mixture in conventional way, e.g. by salting out and filtration.

According to a preferred aspect of the invention there are employed amines of formula (II) and of formula (III) so that in the final iron-complex or iron-complex mixtures both radicals —$D_1$ and —$D_2$ [—$D_2$ preferably being a radical of formula ($b_1$) and/or ($b_2$)] are present, respectively both complexants (Ia) and (Ib) [preferably (Ia) and ($Ib_1$) and/or ($Ib_2$)] are present in the iron-complex or iron-complex mixture as Fe-bound ligand-radicals. The molar ratio of amines of formula (II) to amines of formula (III) [in particular (V) or (VI)] is preferably in the range of 1:10 to 10:1, more preferably 1:3 to 3:1, the disazo compounds of formulae (Ia) and (Ib) being present in the Fe-complexes as Fe-bound ligand-radicals in corresponding amounts. At least one radical of formula ($b_1$) and/or ($b_2$) is preferably present as —$D_2$, respectively at least one complexant of formula ($Ib_1$) and/or ($Ib_2$) is present as a complexant in the form of an Fe-bound ligand-radical in the iron-complex or iron-complex mixture. If ($b_1$) and ($b_2$) are present, i.e. if the diazo compounds of amines of formula (V) and (VI) are employed, the molar ratio of amines of formula (VI) to the other ones [of formula (II) and of formula (V)] is preferably in the range of 1:10 to 4:1, preferably 1:5 to 3:1. The molar ratio of the amines of formulae (II):(V):(VI) [and analogously of the complexants of formulae (Ia):($Ib_1$):($Ib_2$)] may advantageously range in the scope of (0.0 to 0.7):(0.0 to 0.8):(0.0 to 0.91), the sum totalling 1.0; the quantity of amine of formula (II) advantageously is ≠0.0, preferably ≧0.09, especially ≧0.2. Where all three amines of formulae (II), (V) and (VI) are employed the molar ratio of the amines of formulae (II):(V):(VI) [and analogously of the complexants of formulae (Ia):($Ib_1$):($Ib_2$)] most preferably is in the range of (0.2 to 0.5):(0.3 to 0.5):(0.1 to 0.4). If X signifies hydroxy the molar ratio of amine of formula (II) to the total of the amines of formulae (II) and (III), respectively of the corresponding complexant (Ia) to the total of the complexants (Ia)+(Ib), is preferebly ≦0.4.

The diazo compounds of amines of formulae (II) and/or (V) and/or (VI) are preferably used in excess over the stoichiometric quantity, in particular each in an excess of up to 30 mol-%, preferably 10 to 30 mol-%. As stoichiometric quantity there is intended a total of 2 moles of amine(s) of formula D—$NH_2$+formula (VII) per mole of resorcinol, or a total of 1 mole of amine(s) of formula D—$NH_2$ per mole of resorcinol, as would be stoichiometrically required for the obtention of 1 mole of disazo compound(s) of formula (I). Where an excess of diazo compounds is used a minor amount of resorcinol (e.g. 2 to 30 mol-% of the first quantity of resorcinol, depending on the excess the diazo compound (s) may be added when the disazo dyes of formula (I) have at least in part been formed and preferably before the last coupling with the diazo compound of an amine of formula (III), in order to couple any still available diazo compound and to take part in the coupling with the last diazo compound, so that the mixture may contain also some non-metallizable mono- or dis- azo dye, in particular
D$_2$—N=N→resorcinol or D$_2$—N=N→resorcinol←N=N—D$_2$. The resulting disazo compounds or disazo compound mixtures of the formula

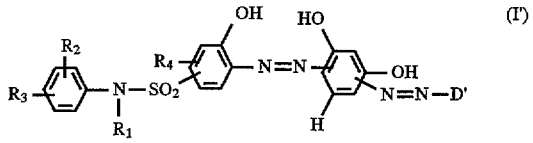

may contain in the reaction mixture some non-reacted monoazo dye, some non-coupled diazocomponents rasp. their decomposition products, some disazo dye in which resorcinol is coupled twice with the diazo compound of the amine of formula (VII) and/or other diazo components, in particular as stated above, and some trisazo dye, as by-products and similarly the iron-complexes of the invention may contain as by-products some iron-complexes containing monoazo complexant in the form of Fe-bound ligand-radical, and some iron-complexes containing trisazo complexant as Fe-bound ligand-radical. Most of the by-products (mainly decomposition products of non-coupled diazo compounds some non-metallized complexant) may be eliminated when isolating the dye, e.g., by salting out and filtration. By-products as mentioned may be present e.g. in an amount of up to 10% by weight, preferably up to 5% by weight of the final dye. If desired the obtained dyes may be (further) purified in order to eliminate any undesired by-product. The presence of the indicated amounts of by-products may be tolerated and a purification of the dye, although possible, is not necessary.

The iron-complexes of the invention are readily hydrosoluble and serve as anionic dyes and are suitable for the dyeing of substrates dyeable with anionic dyes. They may be used in the form as has been synthesized and, if necessary, purified or even be blended with conventional blending agents (in particular with inorganic salts, preferably sodium carbonate, sulphate or chloride, with non-electrolyte blending agents, preferably dextrine and/or urea and optionally—for the production of granular or liquid forms—with corresponding suitable additives). The dyes may be used in any conventional form, e.g. as powder, liquid compositions or granules; for the production of especially electrolyte-poor compositions, the dyes may be purified, e.g. by dialysis, before any blending with non-electrolyte blending agents.

Any substrate that is dyeable with anionic dyes is suitable as a substrate that may be dyed with the iron complexes of the invention; these include natural and regenerated cellulose, polyurethanes, basically modified high polymers (e.g. basically modified polypropylene), natural or synthetic polyamides or anodised aluminum, in particular, however, leather substrates. The substrate to be dyed may be in any conventional form, e.g. in the form of loose fibres, filaments, yarns, non-woven webs, woven or knitted goods, carpets, half-ready-made and ready-made soft goods and tanned leather or pelts. The dyes may be employed in any desired concentration up to the saturation of the substrate. The dyeing may be carried out by any conventional methods that are suitable for the substrate to be dyed, e.g. by exhaustion or impregnation methods (e.g. padding or printing), preferably from aqueous medium; for synthetic substrates, the dye may optionally also be incorporated into the synthetic mass. Paper may be dyed in the pulp or after sheet formation. The dyes of the invention are, however, mainly suitable for the dyeing of leather and pelts.

Any kinds of leather which are conventionally dyed from aqueous medium are suitable, particularly grain leather (e.g. nappa from sheep, goat or cow and box-leather from calf or cow) suede leather (e.g. velours from sheep, goat or calf and hunting leather) split velours (e.g. from cow or calf skin) bukskin and nubuk leather; further also wool-bearing skins and furs (e.g. fur-bearing suede leather). The leather may have been tanned by any conventional tanning method, in particular vegetable, mineral, synthetic or combined tanned (e.g. chrome tanned, zirconyl tanned, aluminum tanned or semi-chrome tanned). If, desired, the leather may also be re-tanned; for re-tanning there may be used any tanning agent, conventionally employed for re-tanning, e.g. mineral, vegetable or synthetic tanning agents [e.g. chromium, zirconyl or aluminum derivatives, oak, quebracho, chestnut or mimosa extracts, aromatic syntans, polyurethanes, (co) polymers of (meth)acrylic acid compounds or melamine/, dicyanodiamide/ and/or urea/formaldehyde resins]. Thus leathers of very high to very low affinity for anionic dyes may be used.

The leathers may be of various thicknesses, thus, there may be used very thin leathers, such as book-binder's leather or glove-leather (nappa), leather of medium thickness, such as shoe upper leather, garment leather and leather for handbags or also thick leathers, such as shoe-sole leather, furniture leather, leather for suitcases, for belts and for sport articles; air-bearing leathers and furs may also be used. After tanning (in particular after a re-tanning) and before dyeing, the pH of the leather is advantageously set to values in the range of 4 to 8 (the leather is "neutralized"); depending on the kind of the leather, there may be chosen an optimum pH range, e.g. for grain leather pH values in the range of 4 to 6, for suede leather and split velours and for very thin leathers pH-values in the range of 4.5 to 8, for intermediately dried suede leathers and intermediately dried split velours, the pH may range in the scope of 5 to 8. For the adjustment of the pH-value of the leather there may be employed conventional assistants; for tanned leather of acidic character the pH may be adjusted by addition of suitable bases, e.g. ammonia, ammonium bicarbonate or alkali metal salts of weak acids, e.g. sodium formate, sodium acetate, sodium bicarbonate, sodium carbonate or sodium bisulfite, of which sodium formate and ammonia are preferred. Sodium carbonate and sodium bicarbonate are usable in particular as second bases for the exact adjustment of the superficial pH-value of the leather. Mineral tanned leather may, if desired, also be masked, e.g. with alkali metal formate, oxalate or polyphosphate or e.g. with titanium/potassium oxalate.

The dyeing may be carried out in a manner known per se suitably in an aqueous medium and under conventional temperature and pH conditions, e.g. in the temperature range of 20° to 80° C., preferably 25° to 70° C., milder temperature conditions, in particular in the range of 25° to 40° C., being preferred for the achievement of deeper penetrations and for the dyeing of wool-bearing skins and furs. The pH-values of the dyebath may, in general, range broadly; mainly from pH 8 to pH 3; in general the dyeing may be advantageously begun at higher pH-values and concluded at lower pH-values. Preferably the dyeing is carried out at pH-values $\geq 4$, in particular in the range of 8 to 4 and for the conclusion of the dyeing procedure the pH-value is lowered (e.g. by addition of an acid conventional in the leather dyeing technique such as acetic acid or formic acid) preferably to values in the range between 4 and 3. The dye concentration may range broadly, if desired, up to the saturation degree of the substrate, e.g. up to 5%, referred to the wet weight of the substrate. The dyeing may be carried out in one or more stages, e.g. in two stages, optionally with insertion of charge reversal of the substrate by means of conventional cationic assistants.

Since the dyes of the invention have excellent levelling properties even on leathers of high affinity for anionic dyes, it is in general not necessary to employ any dyeing assistants. The dyes of the invention are, however, also compatible with dyeing assistants and may, if desired, be employed in combination with conventional dyeing assistants, mainly non-ionic or anionic products (in particular surfactants, preferably hydrophilic polysaccharide derivatives, polyoxyethylated alkylphenols or alcohols, lignosulphonates or sulpho group-containing aromatic compounds).

A fatting may, if desired, be carried out before and/or after the dyeing process, in particular also in the same liquor. For fatting after the dyeing process the fatting agent is advantageously added before the pH of the liquor is lowered, preferably to values between 3 and 4.

For the fatting (in particular fat-liquoring) step there may be used any conventional natural animal, vegetable or mineral fat, fat oil, wax, resin or resin-oil or chemically modified animal or vegetable fat or oil, which include in particular tallow, fish oils, neats-foot oil, olive oil, castor oil, rapeseed oil, linseed oil, wood oil, cottonseed oil, sesame oil, corn oil and japanese tallow and chemically modified products thereof (e.g. hydrolysis, transesterification, oxidation, hydrogenation or sulphonation products), bees-wax, chinese wax, carnauba wax, montan wax, wool fat, colophony, birch oil, shellac, mineral oils with boiling range within 300° and 370° C. (particularly the so-called "heavy alkylates"), soft paraffin, medium paraffin, hard paraffin, vaseline, ceresin and methyl esters of $C_{14-22}$-fatty acids; and synthetic leather fatting agents, including esters, in particular partial esters of polybasic acids (e.g. phosphoric acid) with optionally oxyethylated fatty alcohols. Of the above mentioned the methyl ester, the sulphonation products and the phosphoric acid partial esters, are particularly preferred. By the term "sulphonation" for the fatting agents, there is meant generally the introduction of the sulpho group including also the formation of a sulphato group (="sulphating") and the introduction of a sulpho group by reaction with a sulphite or $SO_2$ (="sulphiting").

A conventional leather softener, in particular a cationic leather softener, may, if desired, be applied in a final step, particularly if fatting has been carried out with a sulphonated fat-liquoring agent.

The treated substrate may then be further treated in conventional manner, e.g. rinsed or washed, drained, dried and cured.

The iron complex dyes of the invention are, especially in the form of their alkali metal salts, readily soluble in water, they display a surprisingly good stability to electrolytes (in particular inorganic ions), specifically also to bases and acids and are distinguished especially on leather by their good build-up and a high degree of insensitivity to variations of the affinity of the leather towards anionic dyes, very level and intense dyeings of good penetration and high colour-yield being obtainable. The dyeings, especially on leather, have excellent fastness properties, for example wet-fastnesses, fastness to rubbing, fastness to acids, light-fastness and [especially the dyeings obtained with Fe-complexes of complexants comprising such of formula (Ia) and (Ib$_1$)] stability to PVC-migration. They are readily combinable with other anionic dyes, in particular such with similar tinctorial behaviour. There may be obtained very level, deep, fine, dyeings, grain side and flesh side being very evenly dyed, the shade of the dyeings on different kinds of leather being equal or very similar; in admixture with corresponding dyes with which the dyes of the invention are combinable, there may also be obtained very deep and regular dyeings of high yield and optimum fastnesses.

In the following examples percentages are by weight and the temperatures are indicated in degrees Celsius. In the dyeing Examples the percentages refer to the wet weight of the substrate, if not otherwise indicated and if they do not clearly refer to a concentration.

EXAMPLE 1 a) 13.2 g (0.05 moles) of 1-amino-2-hydroxybenzene-5-(N-phenyl)sulphonamide are diazotized in conventional manner in aqueous medium with $NaNO_2$ and hydrochloric acid and coupled at pH 9.5 and at a temperature of 0°–3° C. with 5.5 g (0.05 moles) of 1,3-dihydroxybenzene dissolved in 100 ml of ice/water, the pH of 9.5 being adjusted by addition of aqueous 30% sodium hydroxide solution. 1.9 g (0.011 moles) of 4-aminobenzenesulphonamide are diazotized in conventional manner in aqueous medium with $NaNO_2$ and hydrochloric acid and coupled with the previous monoazo dyestuff at pH 9 and at a temperature of 2°–3° C. during 2½ hours. 2.78 g (0.0105 moles) of 4-amino-1,1'-diphenylamine-2-sulphonic acid are diazotized in conventional manner in aqueous medium with $NaNO_2$ and hydrochloric acid and then coupled with the previously prepared mixture at the same conditions (pH 9, and 2°–3° C.), during 15 hours (suitably overnight). Finally, 7.61 g (0.044 moles) of 3-aminobenzenesulphonic acid are diazotized in conventional manner in aqueous medium with $NaNO_2$ and hydrochloric acid and coupled with the previous suspension at pH=11.5 and temperature 2°–3° C., during 1 hour. The obtained suspension is stirred for two hours and then heated to 60° C.

b) The pH is adjusted to 5–5.5 with hydrochloric acid and then 8.7 g (0.031 moles) of crystallized ferrous sulphate ($FeSO_4.7H_2O$) are added. The mixture is stirred at 75° C. during two hours, maintaining the pH at 4.0–4.5 by addition of aqueous 30% sodium hydroxide solution. After the metallization the product is precipitated by addition of sodium chloride, filtered at 50° C. and dried. The product dissolves easily in water and dyes leather in a yellowish brown shade.

EXAMPLES 2 TO 6

The following Table 1 contains further examples of iron complexes of the invention, obtainable repeating the procedure of Example 1, with the difference that the employed amines of formulae (II), (VI) and (V) are used in the molar quantities indicated in Table 1. They dye leather in yellowish brown shades.

TABLE 1

| Ex. Nr. | 4-Aminobenzene-sulphonamide | 4-Amino-1,1'-diphenyl-amine-2-sulphonic acid | 3-Aminobenzene-sulphonic acid |
| --- | --- | --- | --- |
| 2 | 0.017 | 0.0133 | 0.036 |
| 3 | 0.009 | 0.0085 | 0.0475 |
| 4 | 0.0118 | 0.011 | 0.043 |
| 5 | 0.0133 | 0.0105 | 0.0418 |
| 6 | 0.014 | 0.012 | 0.040 |

EXAMPLES 7 TO 34

The following Table 2 contains further examples of iron complexes of the invention, obtainable analogously as described in the above Examples 1 to 6, employing the amines of formulae (II), (V), (VI) and (VII) as indicated in Table 2, the last column of the table indicating the molar proportion of the employed amines and the synthetic method used. All the dyes of the table dye leather in yellowish brown shades.

TABLE 2

| Example number | Amine of formula (VII) | Amine of formula (II) | Amine of formula (VI) | Amine of formula (V) | Method and molar ratios as in ex. |
|---|---|---|---|---|---|
| 7.1 to 7.6 | 1-Amino-2-hydroxybenzene-5--(N-phenyl-N-methyl)sulphonamide | 4-Aminobenzene-sulphonamide | 4-Amino-1,1'-diphenylamine-2-sulphonic acid | 3-Aminobenzene-sulphonic acid | 1, 2, 3, 4, 5 and 6 |
| 8.1 to 8.6 | 1-Amino-2-hydroxybenzene-5--(N-phenyl-N-ethyl)sulphonamide | 4-Aminobenzene-sulphonamide | 4-Amino-1,1'-diphenylamine-2-sulphonic acid | 3-Aminobenzene-sulphonic acid | " |
| 9.1 to 9.6 | 1-Amino-2-hydroxybenzene-5--[N-(2'-carboxyphenyl)]sulphonamide | 4-Aminobenzene-sulphonamide | 4-Amino-1,1'-diphenylamine-2-sulphonic acid | 3-Aminobenzene-sulphonic acid | " |
| 10.1 to 10.6 | 1-Amino-2-hydroxybenzene-5--[N-(2'-carboxyphenyl)-N--methyl]sulphonamide | 4-Aminobenzene-sulphonamide | 4-Amino-1,1'-diphenylamine-2-sulphonic acid | 3-Aminobenzene-sulphonic acid | " |
| 11.1 to 11.6 | 1-Amino-2-hydroxybenzene-5--[N-(2'-carboxyphenyl)-N--ethyl]sulphonamide | 4-Aminobenzene-sulphonamide | 4-Amino-1,1'-diphenylamine-2-sulphonic acid | 3-Aminobenzene-sulphonic acid | " |
| 12.1 to 12.6 | 1-Amino-2-hydroxybenzene-5--[N-(3'-hydroxyphenyl)]sulphonamide | 4-Aminobenzene-sulphonamide | 4-Amino-1,1'-diphenylamine-2-sulphonic acid | 3-Aminobenzene-sulphonic acid | " |
| 13.1 to 13.6 | 1-Amino-2-hydroxybenzene-5--[N-(2'-carboxy-4'-sulphamoylphenyl)]sulphonamide | 4-Aminobenzene-sulphonamide | 4-Amino-1,1'-diphenylamine-2-sulphonic acid | 3-Aminobenzene-sulphonic acid | " |
| 14.1 to 14.6 | 1-Amino-2-hydroxybenzene-5--[N-(3'-sulphamoylphenyl)]-sulphonamide | 4-Aminobenzene-sulphonamide | 4-Amino-1,1'-diphenylamine-2-sulphonic acid | 3-Aminobenzene-sulphonic acid | " |
| 15.1 to 15.6 | 1-Amino-2-hydroxybenzene-5--[N-(4'-sulphamoylphenyl)]-sulphonamide | 4-Aminobenzene-sulphonamide | 4-Amino-1,1'-diphenylamine-2-sulphonic acid | 3-Aminobenzene-sulphonic acid | " |
| 16.1 to 16.6 | 1-Amino-2-hydroxybenzene-5--[N-(2'-carboxy-3'-chloro-phenyl)]sulphonamide | 4-Aminobenzene-sulphonamide | 4-Amino-1,1'-diphenylamine-2-sulphonic acid | 3-Aminobenzene-sulphonic acid | " |
| 17.1 to 17.6 | 1-Amino-2-hydroxybenzene-5--[N-(2'-hydroxyphenyl)]sulphonamide | 4-Aminobenzene-sulphonamide | 4-Amino-1,1'-diphenylamine-2-sulphonic acid | 3-Aminobenzene-sulphonic acid | " |
| 18.1 to 18.6 | 1-Amino-2-hydroxybenzene-5--[N-(4'-methoxy-3'-sulphamoylphenyl)]sulphonamide | 4-Aminobenzene-sulphonamide | 4-Amino-1,1'-diphenylamine-2-sulphonic acid | 3-Aminobenzene-sulphonic acid | " |
| 19.1 to 19.6 | 1-Amino-2-hydroxybenzene-5--[N-(4'-hydroxyphenyl)]sulphonamide | 4-Aminobenzene-sulphonamide | 4-Amino-1,1'-diphenylamine-2-sulphonic acid | 3-Aminobenzene-sulphonic acid | " |
| 20.1 to 20.6 | 1-Amino-2-hydroxybenzene-5--[N-(3'-trifluoromethyl-6'--chlorophenyl)]sulphonamide | 4-Aminobenzene-sulphonamide | 4-Amino-1,1'-diphenylamine-2-sulphonic acid | 3-Aminobenzene-sulphonic acid | " |
| 21.1 to 21.6 | 1-Amino-2-hydroxybenzene-5--{N-[4'-(N',N'-diethylamino)-phenyl]}sulphonamide | 4-Aminobenzene-sulphonamide | 4-Amino-1,1'-diphenylamine-2-sulphonic acid | 3-Aminobenzene-sulphonic acid | " |
| 22.1 to 22.6 | 1-Amino-2-hydroxybenzene-5--{N-[3'-(N'-carbamoylmethyl-amino)-phenyl]}sulphonamide | 4-Aminobenzene-sulphonamide | 4-Amino-1,1'-diphenylamine-2-sulphonic acid | 3-Aminobenzene-sulphonic acid | " |
| 23.1 to 23.6 | 1-Amino-2-hydroxybenzene-5--{N-[3'-(N',N'-diethylamino)-phenyl]}sulphonamide | 4-Aminobenzene-sulphonamide | 4-Amino-1,1'-diphenylamine-2-sulphonic acid | 3-Aminobenzene-sulphonic acid | " |
| 24.1 to 24.6 | 1-Amino-2-hydroxybenzene-5--{N-[4'-(N'-carbamoylmethyl-amino)-phenyl]}sulphonamide | 4-Aminobenzene-sulphonamide | 4-Amino-1,1'-diphenylamine-2-sulphonic acid | 3-Aminobenzene-sulphonic acid | " |
| 25.1 to 25.6 | 1-Amino-2-hydroxybenzene-5--{N-[4'-(N',N'-dicarbamoyl-methylamino)-phenyl]}sulphonamide | 4-Aminobenzene-sulphonamide | 4-Amino-1,1'-diphenylamine-2-sulphonic acid | 3-Aminobenzene-sulphonic acid | " |
| 26.1 to 26.6 | 1-Amino-2-hydroxybenzene-5--{N-[3'-(N',N'-dicarbamoyl-methylamino)-phenyl]}sulphonamide | 4-Aminobenzene-sulphonamide | 4-Amino-1,1'-diphenylamine-2-sulphonic acid | 3-Aminobenzene-sulphonic acid | " |
| 27.1 to 27.6 | 1-Amino-2-hydroxybenzene-5--(N-phenyl)sulphonamide | 3-Aminobenzene-sulphonamide | 4-Amino-1,1'-diphenylamine-2-sulphonic acid | 3-Aminobenzene-sulphonic acid | " |
| 28.1 to 28.6 | 1-Amino-2-hydroxybenzene-5--(N-phenyl)sulphonamide | 4-Aminobenzene-sulphonamide | 4-Amino-1,1'-diphenylamine-2-sulphonic acid | 4-Aminobenzene-sulphonic acid | " |
| 29.1 to 29.6 | 1-Amino-2-hydroxybenzene-5--(N-phenyl)sulphonamide | 3-Aminobenzene--(N,N-dimethyl)-sulphonamide | 4-Amino-1,1'-diphenylamine-2-sulphonic acid | 3-Aminobenzene-sulphonic acid | " |
| 30.1 to 30.6 | 1-Amino-2-hydroxybenzene-5--[N-[4'-(N'-carbamoylmethyl-amino)-phenyl]}sulphonamide | 3-Aminobenzene--(N,N-dimethyl)-sulphonamide | 4-Amino-1,1'-diphenylamine-2-sulphonic acid | 3-Aminobenzene-sulphonic acid | " |
| 31.1 to 31.6 | 1-Amino-2-hydroxybenzene-5--(N-phenyl)sulphonamide | 3-Aminobenzene--(N,N-diethyl)-sulphonamide | 4-Amino-1,1'-diphenylamine-2-sulphonic acid | 3-Aminobenzene-sulphonic acid | " |
| 32.1 to 32.6 | 1-Amino-2-hydroxybenzene-5--(N-phenyl)sulphonamide | 3-Aminobenzene--(N,N-diethyl)-sulphonamide | 4-Amino-2'-nitro--1,1'-diphenylamine--4'-sulphonic acid | 3-Aminobenzene-sulphonic acid | " |
| 33.1 to | 1-Amino-2-hydroxybenzene-5- | 4-Aminobenzene- | 4-Amino-4'-nitro- | 3-Aminobenzene- | " |

TABLE 2-continued

| Example number | Amine of formula (VII) | Amine of formula (II) | Amine of formula (VI) | Amine of formula (V) | Method and molar ratios as in ex. |
|---|---|---|---|---|---|
| 33.6 | -(N-phenyl)sulphonamide | sulphonamide | -1,1'-diphenylamine--2'-sulphonic acid | sulphonic acid | |
| 34.1 to 34.6 | 1-Amino-2-hydroxybenzene-5--{N-[3'-(N',N'-dicarbamoyl-methylamino)-phenyl]}sulphonamide | 4-Aminobenzene-sulphonamide | 4-Amino-4'-nitro--1,1'-diphenylamine--2'-sulphonic acid | 3-Aminobenzene-sulphonic acid | " |

EXAMPLES 35.1 TO 35.6

The procedures of Examples 1 to 6 are repeated, with the difference that 0.05 moles of 1-amino-2-hydroxybenzene-5-[N-(4'-acetylaminophenyl)]-sulphonamide are employed in place of the 0.05 moles of 1-amino-2-hydroxybenzene-5-(N-phenyl)sulphonamide and the so obtained reaction products of step a) are treated with 6 g (0.15 moles) of sodium hydroxide, heated to 98°–100° C. and maintained at this temperature for 3 hours. The resulting products are then metallized as described in part b) of Example 1. The obtained iron complex dyes dye leather in yellowish brown shades.

EXAMPLES 36.1 TO 36.6

The procedures of Examples 35.1 to 35.6 are repeated, with the difference that 0.05 moles of 1-amino-2-hydroxybenzene-5-[N-(3'-acetylaminophenyl)]-sulphonamide are employed in place of the 0.05 moles of 1-amino-2-hydroxybenzene-5-[N-(4'-acetylaminophenyl)]-sulphonamide. The obtained iron complex dyes dye leather in yellowish brown shades.

EXAMPLES 1bis TO 36.6bis

The procedures of Examples 1 to 36.6bis are repeated with the difference that in step b) instead of the crystallized ferrous sulphate there is employed the equivalent amount of iron trichloride. The obtained dyes have the same properties as the respective dyes of Examples 1 to 36.6.

EXAMPLE 37 a) 13.2 g (0.05 moles) of 1-amino-2-hydroxybenzene-5-(N-phenyl)sulphonamide are diazotized in conventional manner in aqueous medium with $NaNO_2$ and hydrochloric acid and coupled at pH 9.5 and at a temperature of 0°–3° C. with 5.5 g (0.05 moles) of 1,3-dihydroxybenzene dissolved in 100 ml of ice/water, the pH of 9.5 being adjusted by addition of aqueous 30% sodium hydroxide solution. 1.16 g (0.00617 moles) of 1-amino-2-hydroxybenzene-5-sulphonamide are diazotized in conventional manner in aqueous medium with $NaNO_2$ and hydrochloric acid and coupled with the previous monoazo dyestuff under the same pH and temperature conditions. 3.18 g (0.0185 moles) of 4-aminobenzenesulphonamide are diazotized in conventional manner in aqueous medium with $NaNO_2$ and hydrochloric acid and coupled with the previous monoazo dyestuff at pH 9 and at a temperature of 2°–3° C. during 2½ hours. 3.85 g (0.0146 moles) of 4-amino-1,1'-diphenylamine-2-sulphonic acid are diazotized in conventional manner in aqueous medium with $NaNO_2$ and hydrochloric acid and then coupled with the previously prepared mixture at the same conditions (pH 9, and 2°–3° C.), during 15 hours (suitably overnight). 0.68 g of resorcinol are added and, finally, 7.61 g (0.044 moles) of 3-aminobenzenesulphonic acid are diazotized in conventional manner in aqueous medium with $NaNO_2$ and hydrochloric acid and coupled with the previous suspension at pH 11.5 and temperature of 2°–3° C. during 1 hour. The obtained suspension is stirred for two hours and then heated to 60° C.

b) The pH is adjusted to 5–5.5 with hydrochloric acid and then 8.7 g (0.031 moles) of crystallized ferrous sulphate ($FeSO_4 \cdot 7H_2O$) are added. The mixture is stirred at 75° C. during two hours, maintaining the pH at 4.0–4.5 by addition of aqueous 30% sodium hydroxide solution. After the metallization the product is precipitated by addition of sodium chloride, filtered at 50° C. and dried. The product dissolves easily in water and dyes leather in a yellowish brown shade.

EXAMPLES 38 TO 45

The following Table 3 contains further examples of iron complexes of the invention, obtainable repeating the procedure of Example 37, with the difference that the employed amines of formulae (II), (V) and (VII) and a second addition of resorcinol are used in the molar quantities indicated in Table 3. They dye leather in yellowish brown shades.

TABLE 3

| Ex. Nr. | (1) | (2) | (3) | (4) |
|---|---|---|---|---|
| 38 | 0.04 | 0.01 | 0.0062 | 0.044 |
| 39 | 0.03 | 0.02 | 0.0062 | 0.044 |
| 40 | 0.02 | 0.03 | 0.0062 | 0.044 |
| 41 | 0.05 | 0.01 | 0.01 | 0.044 |
| 42 | 0.05 | 0.02 | 0.02 | 0.044 |
| 43 | 0.05 | 0.03 | 0.03 | 0.06 |
| 44 | 0.04 | 0.0162 | 0.0062 | 0.044 |
| 45 | 0.03 | 0.262 | 0.0062 | 0.044 |

(1) = number of moles of 1-amino-2-hydroxybenzene-5-(N-phenyl) sulphonamide
(2) = number of moles of 1-amino-2-hydroxybenzene-5-sulphonamide
(3) = number of moles of resorcinol in the second addition
(4) = number of moles of 3-aminobenzenesulphonic acid

EXAMPLE 46 a) 26.6 g (0.1 mole) of 1-amino-2-hydroxybenzene-5-(N-phenyl)sulphonamide are diazotized in conventional manner in aqueous medium with $NaNO_2$ and hydrochloric acid and coupled at pH 9.5 and at a temperature of 0°–3° C. with 11 g (0.1 mole) of 1,3-dihydroxybenzene dissolved in 100 ml of ice/water, the pH of 9.5 being adjusted by addition of aqueous 30% sodium hydroxide solution. 5.64 g (0.03 moles) of 1-amino-2-hydroxybenzene-5-sulphonamide are diazotized in conventional manner in aqueous medium with $NaNO_2$ and hydrochloric acid and coupled with the previous monoazo dyestuff at the same pH and temperature. 30.9 g (0.1 mole) of 4'-amino-4-nitro-1,1'-diphenylamine-2-sulphonic acid are diazotized in conventional manner in aqueous medium with $NaNO_2$ and hydrochloric acid and then coupled with the previously prepared mixture at pH 9.5 and temperature 2°–3° C., during 2½ hours.

b) The pH is adjusted to 5–5.5 with hydrochloric acid and then 25.3 g (0.0125 moles) of 40% ferric chloride solution are added. The mixture is stirred at 80° C. during two hours, maintaining the pH at 4.0–4.5 by addition of aqueous 30% sodium hydroxide solution. After the metallization the product is precipitated by addition of sodium chloride, filtered at 50° C. and dried. The product dissolves easily in water and dyes leather in a reddish brown shade.

EXAMPLES 47 TO 55

The following Table 4 contains further examples of iron complexes of the invention, obtainable repeating the procedure of Example 46, with the difference that the employed amines of formulae (II), (VI) and (VII) and a second addition of resorcinol are used in the molar quantities indicated in Table 4. They dye leather in reddish brown shades.

TABLE 4

| Ex. Nr. | (1) | (2) | (3) | (4) |
|---|---|---|---|---|
| 47 | 0.125 | — | — | 0.1 |
| 48 | 0.13 | — | — | 0.1 |
| 49 | 0.11 | — | — | 0.1 |
| 50 | 0.1 | 0.043 | 0.019 | 0.0714 |
| 51 | 0.1 | 0.043 | 0.015 | 0.0714 |
| 52 | 0.08 | 0.05 | — | 0.1 |
| 53 | 0.06 | 0.07 | — | 0.1 |
| 54 | 0.05 | 0.08 | — | 0.1 |
| 55 | 0.03 | 0.10 | — | 0.1 |

(1) = number of moles of 1-amino-2-hydroxybenzene-5-(N-phenyl)sulphonamide
(2) = number of moles of 1-amino-2-hydroxybenzene-5-sulphonamide
(3) = number of moles of resorcinol in the second addition
(4) = number of moles of 4'-amino-4-nitro-1,1'-diphenylamine-2-sulphonic acid

EXAMPLES 37bis TO 46bis AND 50bis TO 55bis

Examples 37 to 46 and 50 to 55 are repeated, with the difference that in place of 1-amino-2-hydroxybenzene-5-sulphonamide there is used the equivalent amount of 1-amino-2-hydroxybenzene-5-(N-methyl)sulphonamide.

EXAMPLES 37ter TO 46ter AND 50ter TO 55ter

Examples 37 to 46 and 50 to 55 are repeated, with the difference that in place of 1-amino-2-hydroxybenzene-5-sulphonamide there is used the equivalent amount of 1-amino-2-hydroxybenzene-5-[N-(3'-methoxypropyl)]sulphonamide.

EXAMPLE 56 a) 26.6 g (0.1 mole) of 1-amino-2-hydroxybenzene-5-(N-phenyl)sulphonamide are diazotized in conventional manner in aqueous medium with $NaNO_2$ and hydrochloric acid and coupled at pH 9.5 and at a temperature of 0°–3° C. with 11 g (0.1 mole) of 1,3-dihydroxybenzene dissolved in 100 ml of ice/water, the pH of 9.5 being adjusted by addition of aqueous 30% sodium hydroxide solution. 6.94 g (0.04 moles) of 3-aminobenzenesulphonic acid are diazotized in conventional manner in aqueous medium with $NaNO_2$ and hydrochloric acid and coupled with the previous monoazo dyestuff at the same pH and temperature. 9.3 g (0.03 moles) of 4'-amino-4-nitro-1,1'-diphenylamine-2-sulphonic acid are diazotized in conventional manner in aqueous medium with $NaNO_2$ and hydrochloric acid and then coupled with the previously prepared mixture at pH 9.5 and temperature 2°–3° C., during 15 hours (suitably overnight).

b) The pH is adjusted to 5–5.5 with hydrochloric acid and then 25.3 g (0.0125 moles) of 40% ferric chloride solution are added. The mixture is stirred at 80° C. during two hours, maintaining the pH at 4.0–4.5 by addition of aqueous 30% sodium hydroxide solution. After the metallization the product is precipitated by addition of sodium chloride, filtered at 50° C. and dried. The product dissolves easily in water and dyes leather in a yellowish brown shade.

EXAMPLE 57

Example 56 is repeated with the difference that in place of 0.03 moles of 4'-amino-4-nitro-1,1'-diphenylamine-2-sulphonic acid there are used 0.04 moles thereof. The obtained iron complex dye dyes leather in a yellowish brown shade.

EXAMPLE 58

Example 57 is repeated, with the difference that in step a) the coupling with the 0.04 moles of 4'-amino-4-nitro-1,1'-diphenylamine-2-sulphonic acid is carried out for 2½ hours, then 0.065 moles of 1-amino-4-nitrobenzene-2-sulphonic acid are diazotized in usual manner and coupled with the previously prepared mixture at pH 9 and at a temperature of 2°–3° C. overnight. The obtained iron complex dye dyes leather in a yellowish brown shade.

EXAMPLES 59 TO 71

The following Table 5 contains further examples of iron complexes of the invention, obtainable repeating the procedure of Examples 56 to 58, with the difference that the employed amines of formulae (II), (V), (VI) and (VII) and resorcinol are used in the molar quantities indicated in Table 5. They dye leather in yellowish brown shades.

TABLE 5

| Ex. Nr. | (1) | (2) | (3) | (4) | (5) |
|---|---|---|---|---|---|
| 59 | 0.08 | 0.02 | 0.1 | 0.03 | — |
| 60 | 0.06 | 0.04 | 0.1 | 0.03 | — |
| 61 | 0.04 | 0.06 | 0.1 | 0.03 | — |
| 62 | 0.08 | 0.02 | 0.069 | 0.0275 | 0.065 |
| 63 | 0.06 | 0.04 | 0.069 | 0.0275 | 0.065 |
| 64 | 0.04 | 0.06 | 0.1 | 0.0275 | 0.065 |
| 65 | 0.08 | 0.02 | 0.1 | 0.0275 | 0.065 |
| 66 | 0.06 | 0.04 | 0.1 | 0.0275 | 0.065 |
| 67 | 0.04 | 0.06 | 0.1 | 0.0275 | 0.065 |
| 68 | 0.08 | 0.02 | 0.1 | 0.04 | — |
| 69 | 0.06 | 0.04 | 0.1 | 0.04 | — |
| 70 | 0.04 | 0.06 | 0.1 | 0.04 | — |
| 71 | 0.1 | — | 0.069 | 0.0275 | 0.065 |

EXAMPLES 59bis TO 70bis

Examples 59 to 70 are repeated, with the difference that in place of 1-amino-2-hydroxybenzene-5-sulphonamide there is used the equivalent amount of 1-amino-2-hydroxybenzene-5-(N-methyl)sulphonamide.

EXAMPLES 59ter TO 70ter

Examples 59 to 70 are repeated, with the difference that in place of 1-amino-2-hydroxybenzene-5-sulphonamide there is used the equivalent amount of 1-amino-2-hydroxybenzene-5-[N-(3'-methoxypropyl)]sulphonamide.

APPLICATION EXAMPLE A (DRUM DYEING)

High affinity leather of 0.8 mm thickness (mastbox wet blue 0.8 mm) is washed in 300% water at 40° C. during 10 minutes and the water is drained off. In a fresh bath of 300% of water at 40° C. the pH is adjusted to 5 by treatment with 2.5% of sodium formate, during 15 minutes, and 1% sodium bicarbonate, during 45 minutes, and then the bath is drained off. The leather is washed with 300% water during 5 minutes and the bath is drained off. For retanning are added 150% water and 3% of a phenolic syntan (Tanigan 3 LN) and retanning is continued for 60 minutes at 40° C.; then the bath is drained off and the leather is fatted with 100% water and 6.5% of a fat-liquor, (6% sulphited fish oil stabilized with 0.5% emulsifier) during 60 minutes at 50° C. The bath is drained off and the leather is washed with 300% water at 25° C. during 5 minutes. The leather is prepared by treatment with 1000% water at 50° C. during 30 minutes and is then dyed with 2.5% of the iron complex dyestuff of Example 1 or 1bis under these conditions during 60 minutes. Afterwards, 2% of formic acid (of 85% concentration) are added and the treatment is continued for 45 minutes at 50° C. Finally, the leather is washed with 1000% of water at 25° C. during 5 minutes, then the bath is drained off, the leather is discharged, dried hanging and cured in the usual way. It is dyed in an intense regular yellowish brown shade.

APPLICATION EXAMPLE B (DRUM DYEING)

High affinity leather of 0.8 mm thickness (mastbox wet blue 0.8 mm) is neutralized with 0.8% sodium bicarbonate in 250% water at 35° C. during 30 minutes. The leather is washed with 1000% water at 25° C. during 5 minutes reaching a pH 4.7–4.8. The bath is drained off and the leather is dyed in 250% water with 0.5% of the iron complex dyestuff of Example 1 or 1bis at 55° C. during 20 minutes. 0.2% formic acid (of 85% concentration) are added and the treatment is continued for 30 minutes. The bath is drained off and the leather is washed with 1000% water at 25° C. during 5 minutes. The leather is then fatted in a fresh bath with 3% of fat-liquor (1.4% sulphited fish oil and 1.4% of a mixture of sulphated fish train and fatty acid methyl esters, stabilized with 0.2% emulsifier) in 250% water at 50° C. during 60 minutes. Finally the leather is washed with 1000% water at 35° C. during 5 minutes. The bath is then drained off and the leather is discharged, dried hanging and cured in the usual way. It is dyed in a light, regular, yellowish brown shade.

Analogously as the iron complex dye of Example 1, respectively 1bis, each of the iron complex dyes of Examples 2 to 70ter and 71 are employed in the above Application Examples A and B.

We claim:

1. An iron complex of a compound of the formula

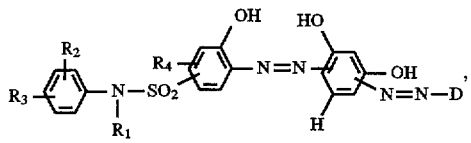

an iron complex of two compounds of said formula or a mixture of such iron complexes, wherein D is a monocyclic or bicyclic aromatic diazo component radical of the benzene series containing one —$SO_3M$ group or is

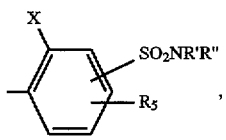

wherein
$R^1$ is hydrogen, $C_{1-4}$alkyl, $C_{2-4}$hydroxyalkyl, methoxy-($C_{2-4}$alkyl) or

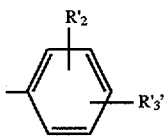

wherein
$R_2'$ is hydrogen, chloro, hydroxy, $C_{1-2}$alkyl, $C_{1-2}$alkoxy or —$SO_2NR_oR_o$, and
$R_3'$ is hydrogen, $C_{1-2}$alkyl, $C_{1-2}$alkoxy, trifluoromethyl, —COOM or —NR'''R'''', and
R" is hydrogen, $C_{1-4}$alkyl, $C_{2-4}$hydroxyalkyl or methoxy-($C_{2-4}$alkyl), or
—NR'R" is a saturated nitrogen-containing 5- or 6-membered heterocyclic ring,
$R_5$ is hydrogen, chloro or $C_{1-2}$alkyl, and
X is hydrogen or hydroxy,
$R_1$ is hydrogen, methyl or ethyl,
$R_2$ is hydrogen, chloro, hydroxy, $C_{1-2}$alkyl, $C_{1-2}$alkoxy or —$SO_2NH_oR_o$,
$R_3$ is hydrogen, $C_{1-2}$alkyl, $C_{1-2}$alkoxy, —COOM, trifluoromethyl or —NR'''R'''', and
$R_4$ is hydrogen, chloro or $C_{1-2}$alkyl,
wherein each R''' and R'''' is independently $C_{1-4}$alkyl, $C_{2-4}$hydroxyalkyl, methoxy($C_{2-4}$alkyl) or carbamoyl($C_{1-2}$alkyl), or
—NR'''R'''' is a saturated nitrogen-containing 5- or 6-membered heterocyclic ring,
each $R_o$ is independently hydrogen, $C_{1-4}$alkyl, $C_{2-4}$hydroxyalkyl or methoxy($C_{2-4}$alkyl), or
—$NR_oR_o$ is a saturated nitrogen-containing 5- or 6-membered heterocyclic ring, and
each M is hydrogen or a cation.

2. An iron complex or a mixture of iron complexes according to claim 1 which is an iron complex of at least one compound of the formula

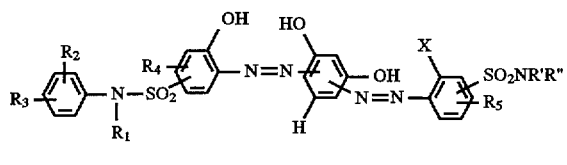

or

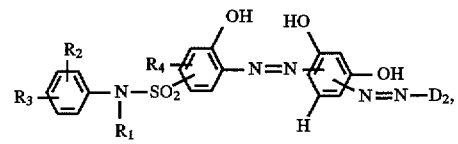

an iron complex of at least one compound of the formula

[chemical structure with substituents $R_1, R_2, R_3, R_4, R_5, X$, $SO_2NR'R''$]

at least one compound of the formula

[chemical structure with substituents $R_1, R_2, R_3, R_4$, $D_2$]

or a mixture of such iron complexes, wherein $D_2$ is a monocyclic or bicyclic aromatic diazo component radical of the benzene series containing one —$SO_3M$ group.

3. An iron complex or a mixture of iron complexes according to claim 2 which is an iron complex of a compound of the formula

[chemical structure with substituents $R_1, R_2, R_3, R_4, R_5, X$, $SO_2NR'R''$]

a compound of the formula

[chemical structure with substituents $R_1, R_2, R_3, R_4$, $D_2$]

or a mixture of such iron complexes.

4. A mixture of iron complexes according to claim 2 which is a mixture of iron complexes of
(i) at least one compound of the formula

[chemical structure with substituents $R_1, R_2, R_3, R_4, R_5, X$, $SO_2NR'R''$]

and
(ii) at least one compound of the formula

[chemical structure with substituents $R_1, R_2, R_3, R_4$, $D_2$]

wherein the molar ratio of (i) to (ii) is 10:1 to 1:10.

5. A mixture of iron complexes according to claim 4 wherein

[chemical structures showing $D_2$ is a ring with $R_7$, $SO_3M$, $R_6$ substituents, or a diphenylamine-type structure with $R_8, R_9, R_{10}$]

wherein
$R_6$ is hydrogen, $C_{1-2}$alkyl, $C_{1-2}$alkoxy or nitro,
$R_7$ is hydrogen, chloro or $C_{1-2}$alkyl,
$R_8$ is hydrogen, methoxy, nitro or —$SO_3M$,
$R_9$ is hydrogen, methoxy, nitro or —$SO_3M$, and
$R_{10}$ is hydrogen, —$SO_2NR_oR_o$ or —$SO_3M$, with the provisos that at least one of $R_8$, $R_9$ and $R_{10}$ is hydrogen, and one of $R_8$, $R_9$ and $R_{10}$ is —$SO_3M$,
R' is hydrogen, $C_{1-4}$alkyl, $C_{2-4}$hydroxyalkyl, methoxy($C_{2-4}$alkyl) or

[chemical structure of phenyl ring with $R_2'$ and $R_3'$], wherein
$R_2'$ is hydrogen, chloro, hydroxy, $C_{1-2}$alkyl, $C_{1-2}$alkoxy or —$SO_2NR_oR_o$, and
$R_3'$ is hydrogen, $C_{1-2}$alkyl, $C_{1-2}$alkoxy, trifluoromethyl, —COOM or —NR'''R'''', and
R'' is hydrogen, $C_{1-4}$alkyl, $C_{2-4}$hydroxyalkyl or methoxy($C_{2-4}$alkyl), or
—NR'R'' is pyrrolidino, morpholino or piperidino,
wherein each R''' and R'''' is independently $C_{1-4}$alkyl, $C_{2-4}$hydroxyalkyl, methoxy($C_{2-4}$alkyl) or carbamoyl($C_{1-2}$alkyl), or
—NR'''R'''' is pyrrolidino, morpholino or piperidino, and
each $R_o$ is independently hydrogen, $C_{1-4}$alkyl, $C_{2-4}$hydroxyalkyl or methoxy($C_{2-4}$alkyl), or
—NR$_o$R$_o$ is pyrrolidino, morpholino or piperidino.

6. A mixture of iron complexes according to claim 5 wherein each M is hydrogen, lithium, sodium, potassium, magnesium, ammonium, ethanolammonium, diethanolammonium, triethanolammonium, isopropanolammonium, diisopropanolammonium or triisopropanolammonium.

7. A mixture of iron complexes according to claim 6 wherein each M is sodium or potassium.

8. A mixture of iron complexes according to claim 5 wherein R' is hydrogen, methyl, ethyl, γ-methoxypropyl or

[chemical structure of phenyl ring with $R_2''$ and $R_3''$], wherein
$R_2''$ is hydrogen, chloro or —$SO_2NR_o''R_o''$, and
$R_3''$ is hydrogen, methyl, methoxy or —COOM,
R'' is hydrogen, methyl or ethyl,
$R_2$ is hydrogen, chloro or —$SO_2NR_o''R_o''$, and
$R_3$ is hydrogen, methyl, methoxy or —COOM,
wherein each $R_o''$ is independently hydrogen, methyl or ethyl.

9. A mixture of iron complexes according to claim 8 wherein
R₁ is hydrogen,
each

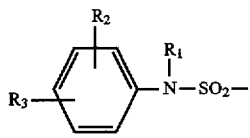

and —SO₂NR'R" group is meta or para to the —N=N— radical attached to the ring to which said group is attached, and each —SO₂NR₀'''R₀''' group is meta or para to the —NR₁— radical attached to the ring to which it is attached.

10. A mixture of iron complexes according to claim 9 wherein each M is hydrogen, lithium, sodium, potassium, magnesium, ammonium, ethanolammonium, diethanolammonium, triethanolammonium, isopropanolammonium, diisopropanolammonium or triisopropanolammonium.

11. A mixture of iron complexes according to claim 10 wherein each M is sodium or potassium.

12. A mixture of iron complexes according to claim 5 which is a mixture of iron complexes of
(i) at least one compound of the formula

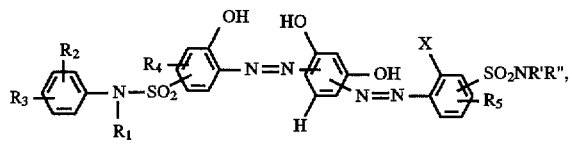

(iia) at least one compound of the formula

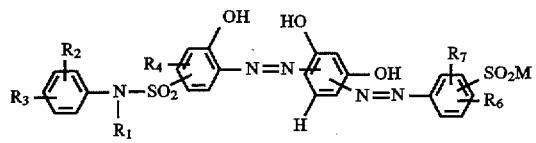

and
(iib) at least one compound of the formula

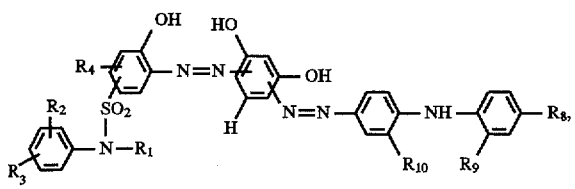

wherein the molar ratio of (i) to the sum of (iia) and (iib) is 10:1 to 1:10.

13. A mixture of iron complexes according to claim 12 wherein the molar ratio of (i) to the sum of (iia) and (iib) is 3:1 to 1:3.

14. A mixture of iron complexes according to claim 12 wherein each M is hydrogen, lithium, sodium, potassium, magnesium, ammonium, ethanolammonium, diethanolammonium, triethanolammonium, isopropanolammonium, diisopropanolammonium or triisopropanolammonium.

15. A mixture of iron complexes according to claim 14, wherein each M is sodium or potassium.

16. A mixture of iron complexes according to claim 12 wherein R' is hydrogen, methyl, ethyl, γ-methoxypropyl or

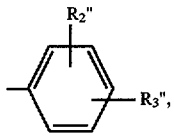

wherein
R₂'' is hydrogen, chloro or —SO₂NR₀'''R₀''', and
R₃'' is hydrogen, methyl, methoxy or —COOM,
R'' is hydrogen, methyl or ethyl,
R₂ is hydrogen chloro or —SO₂NR₀'''R₀''', and
R₃ is hydrogen, methyl, methoxy or —COOM,
wherein each R₀''' is independently hydrogen, methyl or ethyl.

17. A mixture of iron complexes according to claim 16 wherein
R₁ is hydrogen,
each

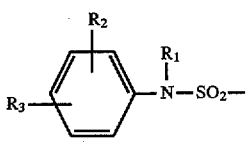

and —SO₂NR'R" group is meta or para to the —N=N— radical attached to the ring to which said group is attached, and each —SO₂NR₀'''R₀''' group is meta or para to the —NR₁— radical attached to the ring to which it is attached.

18. A mixture of iron complexes according to claim 17 wherein each M is hydrogen, lithium, sodium, potassium, magnesium, ammonium, ethanolammonium, diethanolammonium, triethanolammonium, isopropanolammonium, diisopropanolammonium or triisopropanolammonium.

19. A mixture of iron complexes according to claim 18 wherein each M is sodium or potassium.

20. A process for dyeing a substrate dyeable with an anionic dye comprising applying to a substrate dyeable with an anionic dye an iron complex or mixture of iron complexes according to claim 1.

21. A process according to claim 20 wherein the substrate is leather.

* * * * *